United States Patent [19]

Tomko et al.

[11] Patent Number: 5,740,276
[45] Date of Patent: Apr. 14, 1998

[54] HOLOGRAPHIC METHOD FOR ENCRYPTING AND DECRYPTING INFORMATION USING A FINGERPRINT

[75] Inventors: George J. Tomko, East York; Alexei Stoianov, Toronto, both of Canada

[73] Assignee: Mytec Technologies Inc., Don Mills

[21] Appl. No.: 508,297

[22] Filed: Jul. 27, 1995

[51] Int. Cl.⁶ .................................................. G06K 9/76
[52] U.S. Cl. .......................... 382/210; 382/211; 382/124; 382/127; 382/232; 380/4; 380/19; 902/2; 235/494
[58] Field of Search .................. 382/210, 211, 382/124, 127, 280, 232; 359/561; 380/4, 19; 364/822; 902/2

[56] References Cited

U.S. PATENT DOCUMENTS

| | | | |
|---|---|---|---|
| 3,716,301 | 2/1973 | Caulfield et al. | 359/561 |
| 3,743,421 | 7/1973 | Maloney | 382/127 |
| 3,771,129 | 11/1973 | McMahon | 382/127 |
| 4,187,000 | 2/1980 | Constant | 364/822 |
| 4,532,508 | 7/1985 | Ruell | 340/825.34 |
| 4,837,843 | 6/1989 | Owechko | 382/211 |
| 4,876,725 | 10/1989 | Tomko | 382/126 |
| 4,993,068 | 2/1991 | Piosenka et al. | 380/23 |
| 5,040,140 | 8/1991 | Horner | 382/210 |
| 5,050,220 | 9/1991 | Marsh et al. | 382/124 |
| 5,095,194 | 3/1992 | Barbanell | 382/210 |
| 5,109,427 | 4/1992 | Yang | 382/127 |
| 5,138,468 | 8/1992 | Barbanell | 359/2 |
| 5,148,157 | 9/1992 | Florence | 340/783 |
| 5,150,229 | 9/1992 | Takesue et al. | 382/210 |
| 5,159,474 | 10/1992 | Franke et al. | 382/210 |
| 5,245,329 | 9/1993 | Gokcebay | 340/825.31 |

(List continued on next page.)

FOREIGN PATENT DOCUMENTS

| | | | |
|---|---|---|---|
| 0 396 774 | 11/1990 | European Pat. Off. | G06F 3/06 |
| 4 243 908 | 6/1994 | Germany | H04L 9/32 |
| 2 132 857 | 7/1984 | United Kingdom | H04K 1/00 |

OTHER PUBLICATIONS

"Dynamic Holography in Optical Pattern Recognition", Henri Rajbenbach, SPIE vol. 2237 Optical Pattern Recognition V (1994)/pp. 329–346.

"Optical Image Encryption Using Input Plane and Fourier Plane Random Encoding", Philippe Refregier and Bahram Javidi, SPIE vol. 2565 (1995), pp. 62–68.

"Novel Applications of Cryptography in Digital Communictions", Jim K. Omura, IEEE Communications Magazine, vol. 28, 1990, pp. 21–29.

*Primary Examiner*—Jose L. Couso
*Assistant Examiner*—Anh Hong Do
*Attorney, Agent, or Firm*—Marshall, O'Toole, Gerstein, Murray & Borun

[57] ABSTRACT

A method using a fingerprint image as a cipher for optical encrypting and decrypting information which is presented in the form of an analogous signal. The method includes recording a Fourier hologram, the complex amplitude of the spatial grating of the hologram being a Fourier transform of the information image divided by a Fourier transform of the fingerprint image. To prepare the hologram, a full-complex spatial light modulator (SLM) may be used. The parameters of the Fourier transforms are chosen such that the optical spatial frequencies of the information image and the cipher lie in the same physical range. In another embodiment, the intensity distribution of the Fourier spectrum of the fingerprint image is captured. The cipher image is obtained by illuminating a phase-only SLM which is addressed with a function derived from this intensity distribution. The hologram may be amplitude or phase; thin, thick or volume; transparent or reflective; prepared optically or computer-generated. The hologram is attached to a substrate, such as a personal card. To decrypt the information, an individual places the same fingerprint has been used as the cipher onto an input device, and the hologram is illuminated by an optical beam modulated with characteristics of the fingerprint image.

27 Claims, 5 Drawing Sheets

U.S. PATENT DOCUMENTS

| | | | |
|---|---|---|---|
| 5,268,963 | 12/1993 | Monroe et al. | 380/23 |
| 5,280,527 | 1/1994 | Gullman et al. | 380/23 |
| 5,327,286 | 7/1994 | Sampsell et al. | 382/280 |
| 5,343,415 | 8/1994 | Itoh et al. | 382/210 |
| 5,345,508 | 9/1994 | Lynn et al. | 380/46 |
| 5,347,375 | 9/1994 | Saito et al. | 382/210 |
| 5,386,378 | 1/1995 | Itoh et al. | 364/822 |
| 5,418,380 | 5/1995 | Simon et al. | 359/561 |
| 5,428,683 | 6/1995 | Indeck et al. | 380/4 |
| 5,469,506 | 11/1995 | Berson et al. | 380/23 |
| 5,541,994 | 7/1996 | Tomko et al. | 380/30 |

HOLOGRAPHIC METHOD FOR ENCRYPTING AND DECRYPTING INFORMATION USING A FINGERPRINT

BACKGROUND OF THE INVENTION

1. Field of the Invention

This invention relates to optical methods of encryption and decryption of information.

2. Description of the Related Art

The secure storage of information which could be private or confidential on plastic cards, such as smart or optical, on documents or in various databases necessitates the use of some form of encryption techniques. The information may be private, such as medical or financial, or strictly confidential with limited access.

Such a cryptographic system requires a secure and, at the same time, available encryption key. Fingerprints, which are unique for each person, might serve as universal means for this purpose. Success achieved in the past several years in optical processing of fingerprint images allows consideration of optical methods of encryption and decryption of graphic information with fingerprints. The main advantage of optical methods is that they produce an instant decryption, unlike digital methods. The information to be encrypted could be text, a graphic image (for example, a signature or a monogram), or a particular optical signal which in turn is used for further processing.

Ideas regarding optical encryption of information have been previously presented in the prior art. They are based on the following reasoning.

An optical beam carrying the information to be encrypted interferes with another beam modulated by some optical pattern (for example, by a fingerprint image) playing the role of a cipher signal. The interference pattern from the two beams is recorded on a hologram. To decrypt the information, a beam carrying the same optical pattern is directed onto the hologram, and the output produces a reconstructed information image which is free of distortions caused by the optical pattern.

Despite the apparent simplicity of this idea, serious difficulties are evident under closer examination. In fact, either high losses of information in the encryption/decryption process occur, or the extent of protection of the recorded information is not sufficient. To illustrate this, let us consider recording a Fourier hologram (which is usually appropriate due to its translation invariance) by two beams with complex amplitudes $s(r) \exp(ik_1R)$ and $f(r) \exp(ik_2R)$, where $s(r)$ and $f(r)$ are the functions related to the information and the optical pattern, respectively; $r$ is a vector in 2D spatial domain; $k_1$ and $k_2$ are the wave vectors of the optical carrier waves; R is a 3D vector. We will consider thin and thick or volume holograms separately.

1. Thin holograms.

With $S(q)$ and $F(q)$ representing the Fourier transforms of $s(r)$ and $f(r)$, respectively (and q being a two dimensional vector in the Fourier domain), the Fourier transform of the two beams becomes $S(q)\exp(ik_1R)$ and $F(q)\exp(ik_2R)$. In the Fourier domain, when these two beams interfere, they form an intensity pattern, I, as follows:

$$\begin{aligned} I &= |S(q)\exp(ik_1R) + F(q)\exp(ik_2R)|^2 \\ &= |S(q)|^2 + |F(q)|^2 + S(q)F^*(q)\exp[i(k_1-k_2)R] + \\ &\quad S^*(q)F(q)\exp[-i(k_1-k_2)R] \end{aligned}$$

where "*" means complex conjugation.

If a holographic recording medium for an amplitude-type hologram is positioned to record the interference pattern, the response function, T, of the hologram is simply the transmittance of the hologram, and the transmittance is proportional to the intensity pattern, i.e., $T \propto I$. In the spatial domain, the functions $s(r)$ and $f(r)$ vary slowly as compared with the carrier waves $\exp(ik_{1,2}R)$. Therefore, these slowly varying terms are neglected in the Fourier domain, so that:

$$T \propto S(q)F^*(q)\exp[i(k_1-k_2)R]+S^*(q)F(q)\exp[-i(k_1-k_2)R] \quad (1)$$

It is obvious that the information represented by $S(q)$ is indeed encrypted with the Fourier transform $F(q)$, such that $F(q)$ has acted as a cipher signal. If we try to decrypt the information by illuminating the hologram with the same cipher signal wave $F(q)\exp(ik_2R)$, we obtain the following output after an inverse Fourier transformation:

$$s_{out}(r) \propto \int S(q)|F(q)|^2 e^{iqr}dq \quad (2)$$

Note that the reconstructed image $s_{out}(r)$ does not correspond to the pre-recorded one, $s(r)$, because of the presence of $|F(q)|^2$ in Eq. 2. This function, $|F(q)|^2$, is the intensity of the spectrum of the optical pattern $f(r)$ in the Fourier domain. It is known that in the case of random or semi-random patterns $f(r)$ (like a fingerprint image) the function $|F(q)|^2$ displays a speckle-structure, i.e. varies quite strongly versus q. This means that after "decryption" the output image will still be distorted, so the losses of information will be very high. It is possible to obtain an almost undistorted image $s_{out}(r)$ if the actual spatial frequencies of $S(q)$ and $F(q)$ are very different. For example, if the spatial frequencies of $S(q)$ are much smaller than those of $F(q)$, we obtain from Eq. 2

$$S_{out}(r) \propto s(r)|F(0)|^2 \quad (3)$$

However, we would obtain substantially the same result by illuminating the hologram with a wave $f_1(r) \exp(ik_2R)$, where the function $f_1(r)$ is not necessarily the same as the optical pattern $f(r)$; i.e., $$S_{out}(r) \propto s(r) F^*(0) F_1(0) \quad (4)$$

Thus, in case of a large difference between actual spatial frequencies related to the information and to the cipher, the hologram is not sufficiently protected from an unauthorized readout.

2. Thick or volume holograms.

The functions $s(r)$ and $f(r)$ after modulation on a carrier wave can be expanded into a series of partial plane waves:

$$s(r) \exp(ik_1R) = \Sigma_i\, s_i \exp(iQ_iR), \quad f(r) \exp(ik_2R) = \Sigma_j\, f_j \exp(iQ_jR)$$

In hologram recording, a change $\Delta n$ of the refractive index of the storage medium contains all cross products of the partial waves:

$$\Delta n \propto \Sigma_{ij}\, s_i\, f_j^*\, \exp[i(Q_i-Q_j)R]+c.c. \quad (5)$$

(where "c.c." means the complex conjugate).

The main feature of thick and volume holograms is that the Bragg condition is obeyed. This means that in readout the difference of two vectors $Q_m$, $Q_n$ corresponding to the reconstructed and to the reference wave, respectively, has to be equal to one of the grating vectors of the pre-recorded hologram. It is clear that under these circumstances the illumination of the hologram with just an arbitrary plane wave $\exp(iQ_nR)$ from the set of them belonging to the optical pattern spectrum will reconstruct the information image, provided intermodulate noise is neglected:

$$s_{out}(r)\exp(ik_1R) \propto \Sigma_i \, s_i \, f_n^* \, \exp(iQ_iR) = f_n^* \, s(r) \, \exp(ik_1R) \qquad (6)$$

Furthermore, an arbitrary plane wave from the information spectrum will correspondingly reconstruct the optical pattern image. Thus, the security of information recorded by conventional holographic methods is compromised in case of thick or volume holograms.

There is also a method of phase conjugation which may be used for encrypting and decrypting the information. If the optical pattern is a phase-only function, $$f(r) = \exp(i\phi(r)), \qquad (7)$$

and we place both the optical pattern $f(r)$ and the information $s(r)$ onto one beam proportional to $\exp(ik_2R)$, the second beam being a plane wave proportional to $\exp(ik_1R)$, the response function, T, of the recorded hologram of any type (i.e. thin, thick or volume) will be:

$$T(r) \propto s(r) \, e^{-i\phi(r)} \, \exp(i(k_1-k_2)R) + c.c.$$

(here $T(r)$ is not necessarily equivalent to transmittance). Illuminating the hologram by a wave modulated with the same optical pattern from Eq. 7, we will reconstruct the encrypted image, $s_{out} \propto s(r)$. The disadvantage of this method is that it requires strict spatial alignment of the optical pattern during encryption and decryption. Where fingerprint images are used as a optical pattern, this condition could not be obeyed in real time.

SUMMARY OF THE INVENTION

We have found that the drawbacks of the known prior art may be overcome by a new holographic method of using fingerprints to encrypt and decrypt information.

The method for encrypting an information image comprises the following steps: obtaining a fingerprint image signal; obtaining a cipher signal based on a Fourier transform of said fingerprint image signal; obtaining a transformed information image signal to be encrypted; at least one of said cipher signal and said transformed information signal chosen so that a frequency content of said transformed information signal overlaps with a frequency content of said cipher signal; recording a hologram based on said cipher signal and said transformed information image signal such that a complex amplitude of a spatial grating of said hologram comprises a spatial complex conjugate of said transformed information image signal divided by a spatial complex conjugate of said cipher signal.

The method of decryption comprises the steps of: obtaining a coherent optical beam modulated with a fingerprint image; obtaining a cipher signal based on a Fourier transform of said fingerprint image signal; illuminating a pre-recorded hologram with said cipher signal, said pre-recorded hologram having a complex amplitude of a spatial grating comprising a spatial complex conjugate of said transformed information image signal divided by a spatial complex conjugate of said cipher signal; obtaining an optical inverse transform of a beam diffracted from said hologram; and registering an intensity distribution from said diffracted beam.

BRIEF DESCRIPTION OF THE DRAWINGS

In the figures which disclose example embodiments of the invention.

DESCRIPTION OF THE PREFERRED EMBODIMENTS

Figure 1:
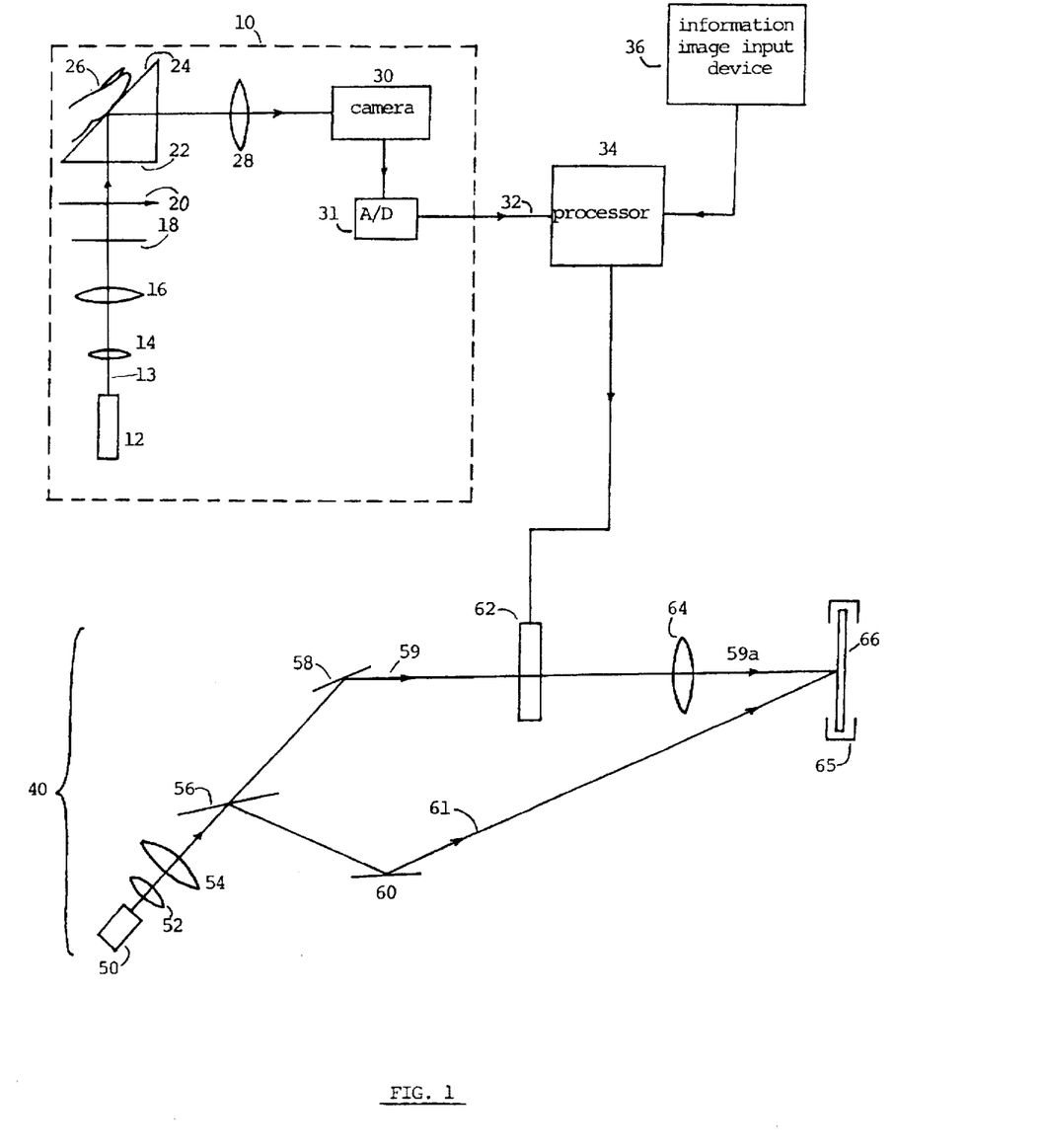
FIGS. 1, 2, and 3 are schematic illustrations of embodiments of the holographic encrypting device.

Referring to FIG. 1, a holographic encrypting device of the present invention comprises a fingerprint input device 10 having a digital output 32 to processor 34, an information image input device 36, and device 40 for preparing a hologram. In a preferred embodiment, the fingerprint input device 10 comprises a source of coherent or incoherent light 12 which directs a light beam 13 through expander lens 14, collimating lens 16, attenuator 18, and polarizer 20 to input prism 22. Meeting conditions of total internal reflection at the surface 24 of the prism, the light is reflected and then it is collected by a projection lens 28 (or by optical system consisting of a set of lenses) and focused onto video camera 30 (such as a CCD camera) which outputs to analog-to-digital converter 31. The hologram can be prepared by several methods: it may be computer-generated or made optically by means of two-beam interference. In a preferred embodiment (FIG. 1), the device 40 for preparing a hologram comprises a source of coherent light 50, expander lens 52, collimating lens 54, beam splitter 56, mirrors 58 and 60, SLM 62, lens 64, and support 65 supporting recording medium 66.

It should be noted that SLM 62 is a full-complex spatial light modulator, that is, it allows independent control of both the amplitude and the phase of the laser beam. One of the methods of creating such a device was disclosed in U.S. Pat. No. 5,148,157 to Florence, the disclosure of which is incorporated herein by reference. To encrypt the information from information input device 36 with a fingerprint optical pattern, a person places his/her finger 26 onto the prism surface 24. This causes a frustration of total internal reflection on the surface 24, so that the reflected beam is modulated with the fingerprint image. The polarizer 20 is set to obtain the light polarized in the plane of incidence, as the extent of frustration of total internal reflection is higher for this polarization state. This will increase the contrast of said fingerprint image. The information image input device 36 having a digital output 35 may be of any type, such as a light detector array with A/D converter, or just a computer-generated sequence of codes.

Let us define $s(r)$ as a 2D function ($r$ is a vector in 2D spatial domain) representing the information image to be encrypted, and $f(r)$ as a 2D function representing the fingerprint image; $S(q)$, $F(q)$ are their Fourier transforms, respectively, where $q$ is a vector in 2D Fourier domain. Processor 34 calculates the Fourier transforms of $s(r)$ and $f(r)$. After obtaining the Fourier transform $F(q)$, the processor removes from the spectrum some undesirable spatial frequencies (such as dc) which do not contain any useful information. The processor then divides $S(q)$ by $F(q)$ for values of $q$ where $|F(q)| \geq F_o$ ($F_o > 0$) and obtains (after complex conjugation) the function $$A(q) = S^*(q)/F^*(q), \text{ for } |F(q)| \geq F_o \qquad (8)$$

Thus, $F(q)$ acts as a cipher signal. To avoid singularities resulting from values of $q$ where $|F(q)|$ is close to 0, $A(q)$ is defined as:

$$A(q) = S^*(q) e^{i \, \text{arg} \, F(q)} / F_o, \text{ for } |F(q)| < F_o \quad (9)$$

A hologram is recorded by means of device 40, the function $A(q)$ being a complex amplitude of the holographic grating.

Preparing the hologram comprises several steps. The processor 34 performs the inverse Fourier transform of the function $A(q)$ as defined by Eqs. 8 and 9 to obtain a 2D complex function $a(r)$:

$$a(r) = FT^{-1}(A(q)) \quad (10)$$

The SLM 62 is then addressed with said function $a(r)$ and is illuminated by coherent light beam 59 from the source 50. The lens 64 optically performs a spatial Fourier transform of the image at the plane of SLM 62 into the plane of recording medium 66 thereby forming an object beam 59a at medium 66. The reference beam 61, which does not carry any useful information, interferes with object beam 59a on the medium 66, so that a hologram is recorded which has $A(q)$ as a complex amplitude of the spatial grating. After developing (if necessary) the hologram is attached to a storage means. It may be a personal card, a document, etc. If the hologram is reflective, this attachment can be nondestructively performed to an existing card or a document.

It should be noted that the hologram may be of any type, such as thin, thick or volume; amplitude or phase; transparent or reflective. The latter may be produced either by an interference of two counterpropagating light beams meeting the Bragg condition (is not shown in drawings, see U.S. Pat. No. 4,876,725 to Tomko) or by recording a thin hologram on a medium with variable relief (such as a thermoplastic medium).

In another embodiment (FIG. 1), the SLM 62 is addressed with the amplitude function $A(q)$, the lens 64 is now an imaging lens; preferably, the distance between SLM 62 and the lens 64 and the distance between the lens 64 and the recording medium 66 are equal to double focal length of said lens 64.

In yet another embodiment (FIG. 2), a holographic encrypting device of the present invention comprises a fingerprint input device 10 which is the same as in FIG. 1, a processor 34, an information image input device 38 and device 42 for preparing a hologram.

Figure 2:
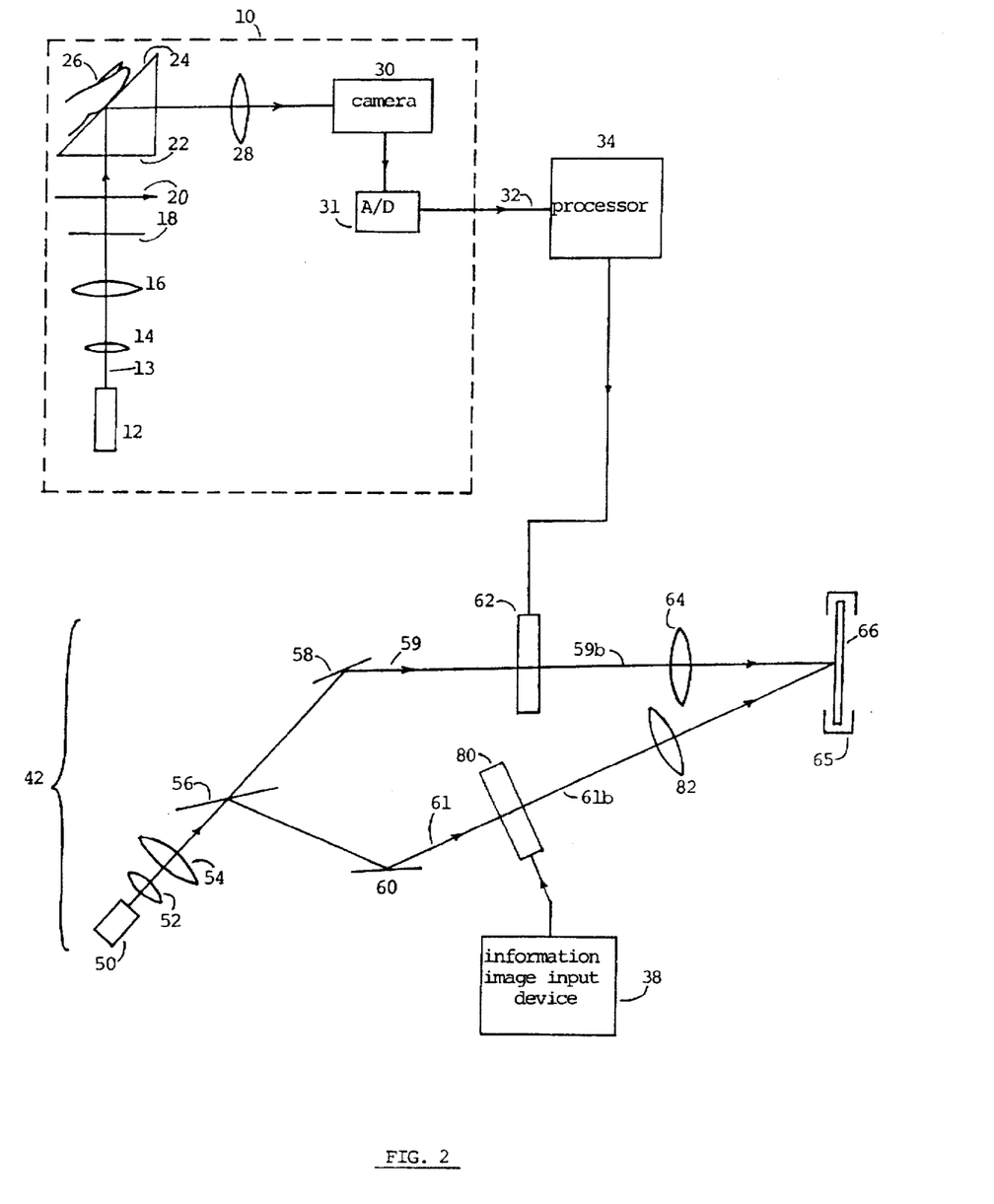

The device 42, in distinction from the device 40 presented in FIG. 1, comprises a second SLM 80 (which is not necessarily full-complex) and a second Fourier lens 82 in the beam 61. Further, the holographic recording medium 66 is a thin hologram. The SLM 80 is directly addressed with the function $s(r)$ from the information input 38. The processor 34, being input with the optical pattern $f(r)$ from input device 10, derives the function $d(r) = FT^{-1}(D(q))$, where $D(q)$ is in turn $$D(q) = C/F^*(q) \text{ for } |F(q)| \geq F_o,$$

$$D(q) = Ce^{i \, \text{arg} \, F(q)} / F_o \text{ for } |F(q)| < F_o \quad (11)$$

(C is a constant).

Full-complex SLM 62 is addressed with $d(r)$.

The function $s(r)$ modulates beam 61 from source 50 to form a modulated beam 61b of the form $s(r)\exp(ik_1R)$. Similarly, the function $d(r)$ modulates beam 59 from source 50 to form a modulated beam 59b of the form $d(r)\exp(ik_2R)$. The lenses 64 and 82 optically perform spatial Fourier transforms of the modulated beams at the plane of recording medium 66.

Because the hologram formed on holographic medium is a thin hologram, the response function, T, of the hologram will simply be its transmittance (in case of amplitude holograms). And therefore, in line with Eq. 1:

$$T \sim S(q)D^*(q)\exp[i(k_1-k_2)R] + S^*(q)D(q)\exp[i(k_2-k_1)R]$$

These two terms mean that during reconstruction there will be at least two diffracted beams propagating in different directions from the hologram. Considering the grating component $\exp[i(k_2-k_1)R]$ and substituting for $D(q)$, the complex amplitude recorded on the holographic grating for the grating component $\exp[i(k_2-k_1)R]$ is:

$$A_1(q) = CS^*(q)/F^*(q), \text{ for } |F(q)| \geq F_o. \quad (12)$$

The holographic recording medium 66 records a thin hologram because thick or volume holograms would not provide sufficient protection from an unauthorized readout for this embodiment of the invention—the considerations in this regard were discussed previously in the section headed "Description of the Related Art".

Figure 3:
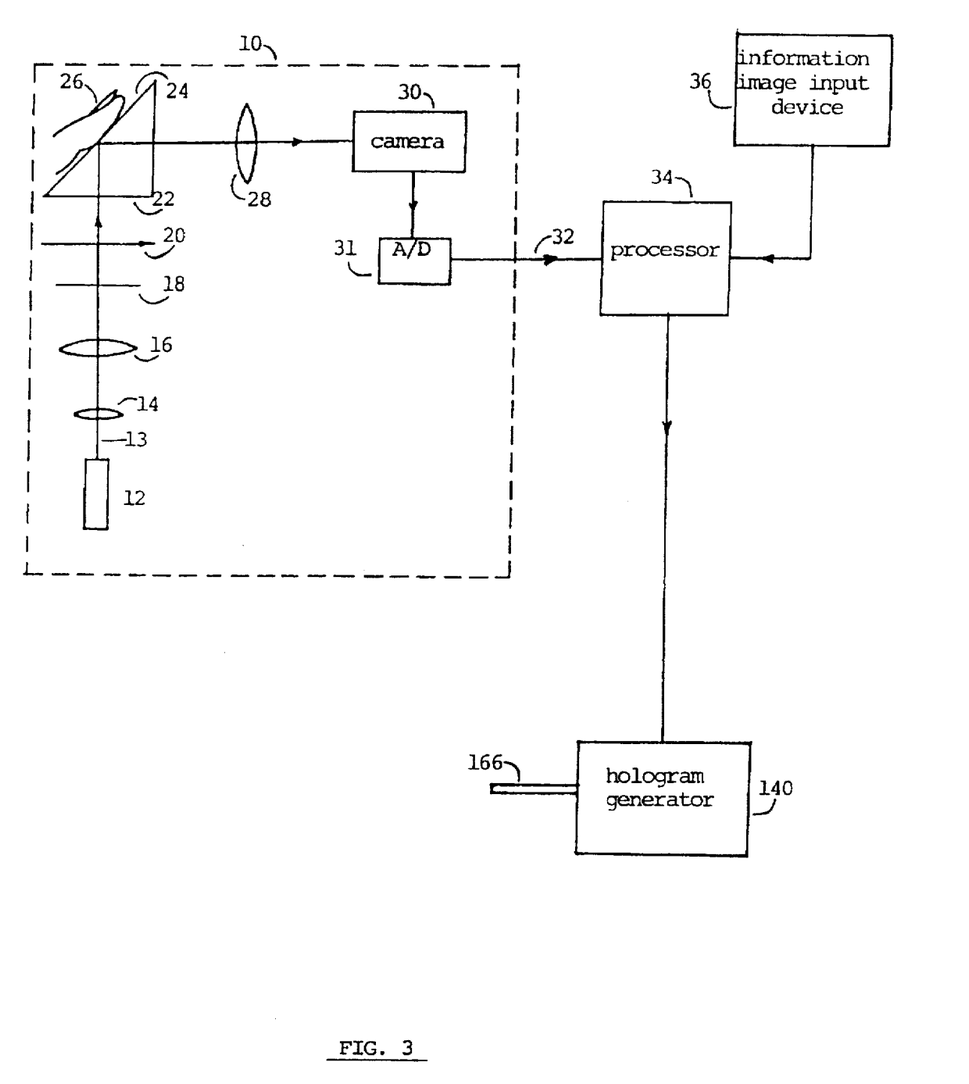
Figure 4A:
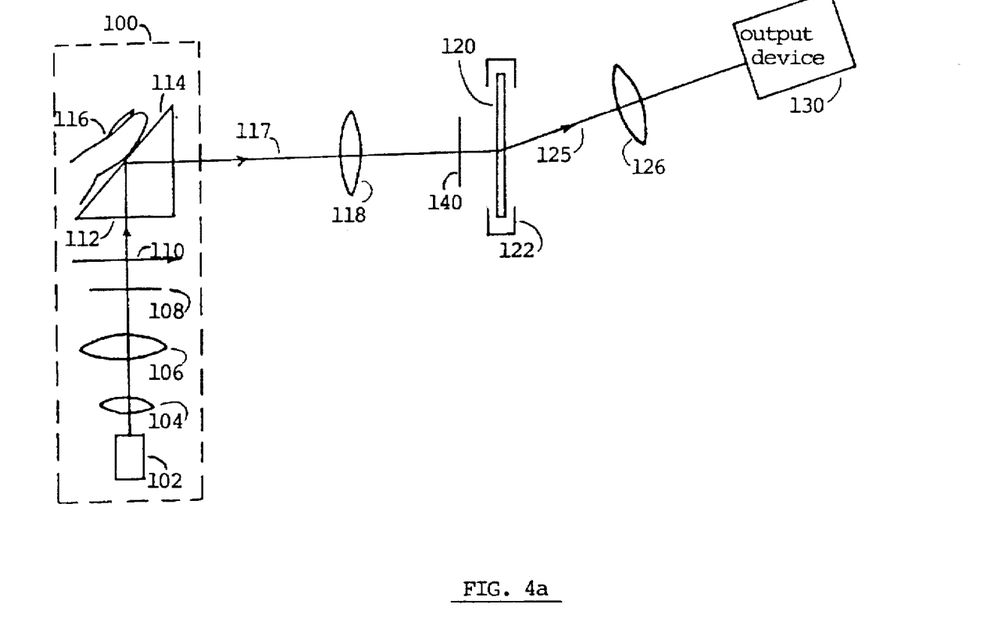
FIGS. 4a, 4b and 5 are schematic illustrations of embodiments of the holographic decrypting device.
Figure 4B:
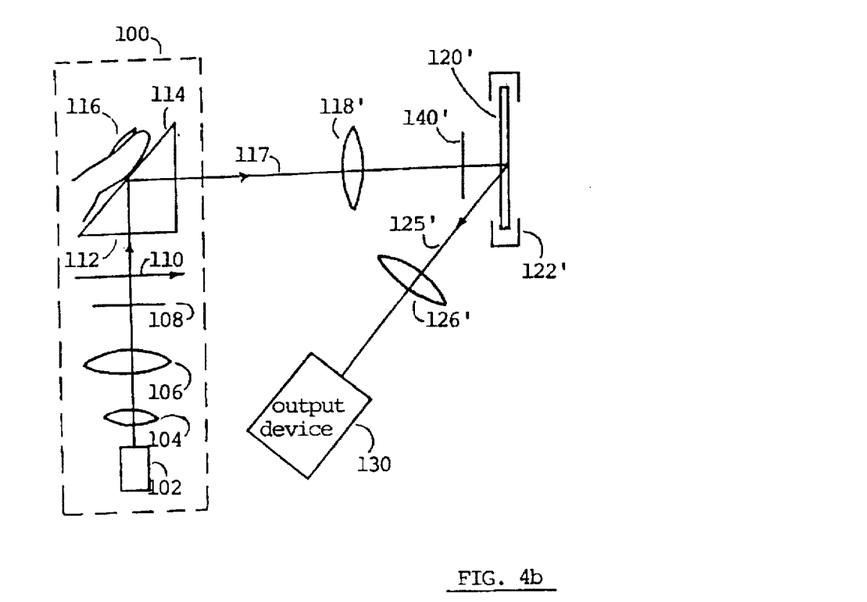

In yet another embodiment (FIG. 3), a hologram generator 140 realizes one of the methods of obtaining computer-generated holograms (see, for example, R. J. Collier, C. B. Burckhardt, and L. H. Lin, Optical Holography. New York: Academic Press, 1971). The processor 34 derives the function $A(q)$ according to Eqs. 8,9 and addresses the device 140 directly with this function. The device 140 prepares a thin hologram 166, the function $A(q)$ being a complex amplitude of the spatial grating of the hologram. A response function (e.g. transmittance) of the hologram 166 has the form $$T \sim A^*(q)e^{i\Delta k x} + A(q)e^{-i\Delta k x}, \quad (13)$$

where the X axis is directed in the plane of the hologram along the grating vector, $\Delta k$. The absolute value and direction of the vector $\Delta k$ are chosen such as to simulate an interference of two beams with wave vectors $k_1$ and $k_2$, so that $\Delta k = k_1 - k_2$ (see Eq. 1). The value $\Delta k$ is determined by the resolution of recording medium and by the resolution of decrypting device (FIGS. 4a, 4b). If the device 140 is capable of generating a full-complex optical filter, the complex transmittance of the hologram may be simply $A^*(q)$, so Eq. 13 will contain only one term at $\Delta k = 0$. In this case we will have an optical filter rather than a hologram, but the term "computer-generated holograms" is often used for computer-generated filters, too.

In all embodiments, the actual optical spatial frequencies related to Fourier transforms of the fingerprint image and of the information image have to be in the same range. In other words, Fourier transforms $F(q)$ and $S(q)$ should overlap each other in the frequency domain; otherwise, the information stored on the hologram would not be sufficiently protected. It is known that the actual range of spatial frequencies of fingerprint images is up to about 4 lines/mm, because higher frequencies contain only a small fraction of fingerprint-related information. The resolution of the SLM also limits the aperture of the information image to be encrypted. Estimates show that, using a liquid crystal display as the SLM, it is quite possible to encrypt one half page of a text. To enhance the amount of encrypted information, various techniques may be used, such as preparing a mosaic hologram (by sequentially inputting portions of the information signal to the encryption device and shifting the holographic recording medium in a stepwise fashion for each input portion) or by sequentially rotating a volume hologram by an angle exceeding the Bragg selectivity of the hologram (this technique has been successfully used with photorefractive media).

Referring to FIG. 4a, a holographic decrypting device comprises a fingerprint input device 100, a pre-recorded hologram 120 placed on a storage means 122, lenses 118 and 126 performing Fourier transform, a mask 140 placed in front of said hologram to eliminate undesirable spatial frequencies in the Fourier spectrum of the fingerprint, and an information output device 130. In a preferred embodiment, the fingerprint input device 100 comprises a source of coherent light 102, expander lens 104, collimating lens 106, attenuator 108, polarizer 110, and an input prism 112. If the hologram 120 is thick or volume, the wavelength of the source 102 has to coincide with the wavelength of the source 50 (of FIGS. 1 and 2) which was used in encrypting, and the angle of incidence of beam 117 on the hologram 120 has to be equal to the angle of incidence of the beam 59 (of FIGS. 1 and 2) on the holographic recording medium 66 (of FIGS. 1 and 2).

To decrypt the information stored on the hologram, a person places a finger 116 onto the prism surface 114. This causes a frustration of the total internal reflection on the surface 114, so reflected beam 117 is modulated with the fingerprint image. Passing through the Fourier lens 118 and the mask 140, the beam 117 impinges on the hologram 120 and is diffracted from it. An output beam 125 is observed in the direction corresponding to the direction of reference beam 61 (of FIGS. 1 and 2) used during encryption. The said directions will coincide if the conditions of hologram recording and readout (i.e. wavelength and angle of incidence) are the same, although in case of a thin hologram this is not necessary. The output beam 125 passes through the Fourier transform lens 126, and the reconstructed image is registered in the focal plane of lens 126 by an output device 130, such as a vidicon or CCD camera. If the fingerprint image f(r) in decryption is the same as it has been in encryption, the complex amplitude of the incident beam 117 in the back focal plane of lens 118 equals F(q). Thus, the cipher signal wave F(q)exp(ik$_2$R) impinges on the hologram so that behind the hologram we have:

$$S_{out} \propto F(q)\exp(ik_2R) \times T$$

Therefore, we have $$S_{out} \propto F(q)\exp(ik_2R) \times \{S(q)/F(q) \times \exp[i(k_1-k_2)R] + S^*(q)/F^*(q) \times \exp[-i(k_1-k_2)R]\} \quad (14)$$

$$\propto S(q)\exp(ik_1R) + S^*(q)/F^*(q) \times F(q)\exp[(2k_2-k_1)R]$$

With a judicious choice of $F_o$, the effect on $S_{out}$ by the components of the recorded F(q) where $|F(q)|<F_o$ do not significantly effect this proportionality. Eq. 14 means there are at least two diffracted beams propagating in different directions. The output device 130 is positioned so as to receive the first order of diffraction, S(q)exp(ik$_1$R), which is transformed to reconstructed information image s(r) in the back focal plane of the lens 126.

In another embodiment (FIG. 4b), a reflective hologram 120' is used. It may be either a volume hologram recorded by two counterpropagating beams or a thin reflective hologram. The diffracted beam 125' is then reflected by the hologram in the direction opposite to that caused by the transmissive hologram, and the reconstructed image s(r) is observed in the focal plane of Fourier lens 126'.

In yet another embodiment of the invention (FIG. 2), an intensity distribution, $|F(q)|^2$, of the Fourier spectrum of a fingerprint image is obtained. This may be done either digitally by the processor 34 or optically by the lens 28, if the CCD camera 30 is moved to the back focal plane of the lens 28. At the next step the processor derives an addressing signal, $\phi(q)$, from the intensity distribution:

$$\phi(q)=O(|F(q)|^2), \quad (15)$$

where O is an operator. In the simpliest case the addressing signal and the intensity distribution are just proportional to each other:

$$\phi(q)=\alpha|F(q)|^2, \quad (16)$$

where $\alpha$ is a constant. If the dynamic range of the CCD camera 30 is not large enough and/or the intensity distribution $|F(q)|^2$ does not contain sufficient amount of the energy at some frequencies to overlap the information signal s(r), the operator O performs an additional randomization of the intensity distribution. For example, $\phi(q)$ can be obtained with a random number generator seeded with $|F(q)|^2$, so that the addressing signal $\phi(q)$ will be randomly distributed vs. q and will completely overlap the Fourier transform of the information signal s(r) to be encrypted. The operator O may also process the function $|F(q)|^2$ to enhance its consistency, for example, by mapping the initial distribution $|F(q)|^2$ with a saturation function.

In this embodiment, the SLM 62 is a phase-only SLM, so that it is addressed with the function $\phi(q)$ which modulates the phase of the first recording beam 59 to obtain a modulated beam 59b of the form exp(i$\phi$(q))exp(ik$_2$R). Thus, the cipher signal is e(i$\phi$(q)) in this embodiment. This modulated beam 59b passes through an imaging lens 64 so that the beam 59b retains its same form at the plane of the holographic recording medium. The second SLM 80 is addressed with the information signal s(r) to form a modulated beam 61b of the form s(r)exp(ik$_1$R). The SLM 80 may be amplitude-only, phase-only, or full-complex depending on the type of information signal. The beam 61b passes through a Fourier transform lens 82 so that, in the plane of the holographic recording medium, the beam is of the form S(q)exp(ik$_1$R). The beams 59b and 61b interfere on a recording medium 66 which records a thin hologram having a response function, T, as follows:

$$T \propto \exp(i\phi(q))S^*(q)\exp(i(k_2-k_1)R)+\exp(-i\phi(q))S(q)\exp(i(k_1-k_2)R)$$

Thus, an amplitude of the holographic grating is:

$$B(q) = \exp(i\phi(q))S^*(q)$$
$$= S^*(q)/\{\exp(i\phi(q))\}^*$$

which, it will be noted, is of the same form as in previous embodiments (with exp(i$\phi$(q)) taking the place of F(q)). Instead of two-beam interference, it is possible to have the hologram recorded by one of the methods of preparing computer-generated holograms.

Figure 5:
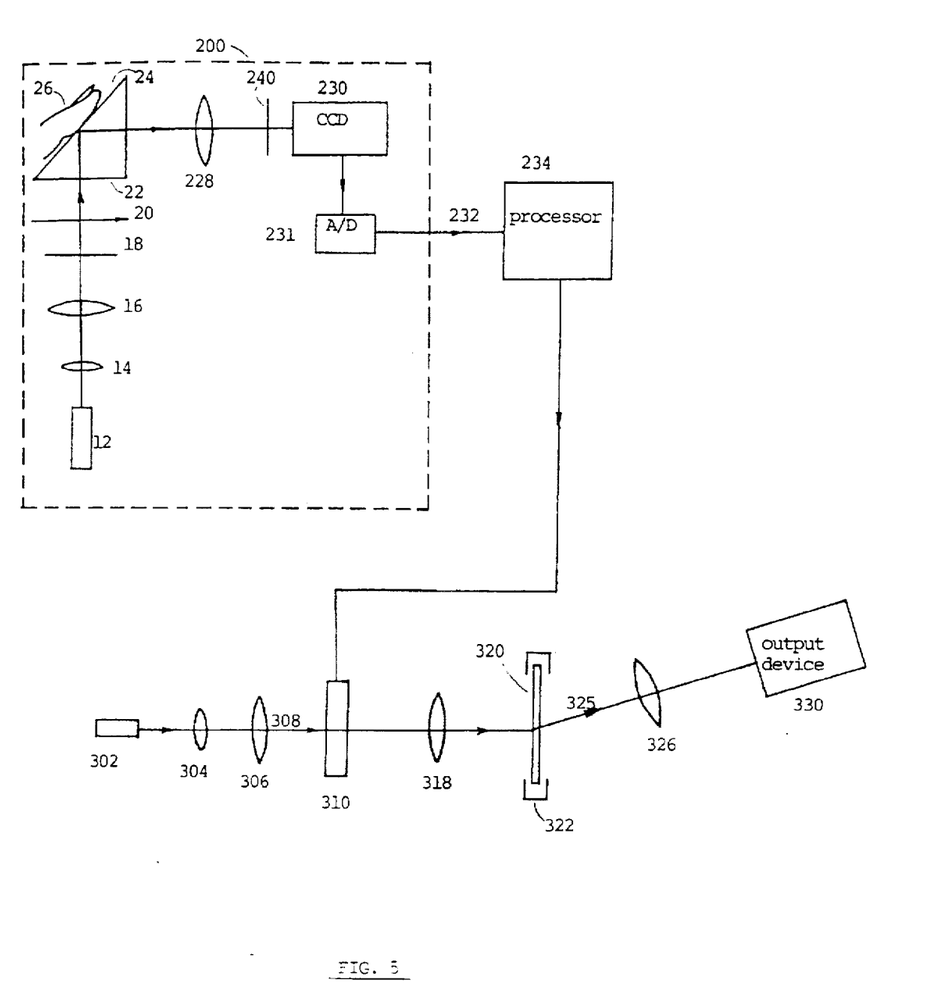

Referring to FIG. 5, a holographic decrypting device of this embodiment comprises a fingerprint input device 200, a processor 234, a pre-recorded hologram 320 placed on a storage means 322, a source of light 302, an expander lens 304, a collimating lens 306, a phase-only SLM 310, an imaging lens 318, a Fourier transform lens 326, and an information output device 330. The fingerprint input device 200 comprises a source of coherent light 12, an expander lens 14, a collimating lens 16, an attenuator 18, a polariser 20, an input prism 22, a Fourier transform lens 228, a mask 240 to suppress undesirable spatial frequencies in the Fourier spectrum of the fingerprint, a CCD camera 230 placed in the focal plane of lens 228, and an A/D converter 231. The lens 228 performs optically the Fourier transform of the fingerprint image, and the CCD camera 230 captures the intensity distribution, $|F(q)|^2$, of the Fourier spectrum. The processor 234 performs the transformation of this intensity distribution according to Eq. 15 to obtain $\phi(q)$ with the operator O being the same as was used during encryption.

SLM 310 is then addressed with the function $\phi(q)$. The beam 308 of light emitted from light source 302, after passing through the SLM 310, is of the form $\exp(i\phi(q))\exp(ik_2R)$. The modulated beam 308 then passes through the imaging lens 318 and impinges on the hologram 320. Behind the hologram, the beam will be of the form $\exp(i\phi(q))\exp(ik_2R)T$ which, by substituting for T, is proportional to:

$$\exp(2i\phi(q))S^*(q)\exp(i(2k_2-k_1)R)+S(q)\exp(ik_1R)$$

The second term is the first-order diffracted beam. Fourier transform lens 326 is positioned so that this first order diffracted beam passes through it. The output device 330 is positioned at the inverse transform plane of lens 326 so as to register the reconstructed image. The relative positions of the SLM 310, the lens 318 and the hologram 320 should coincide with the corresponding positions of the SLM 62, the lens 64, and the recording medium 66, respectively, in the encrypting device (FIG. 2) of this embodiment.

If the fingerprint using in decryption is the same as was used during encryption, the SLM 310 is addressed with the same function $\phi(q)$ as the SLM 62 was addressed. In this case the conditions of phase conjugation are satisfied, so that the information image s(r) is reconstructed in the output. Otherwise (i.e. if the fingerprint in decryption is different), one will obtain a noisy pattern in the output.

It will be appreciated by those skilled in the art that in both embodiments of the invention described in FIG. 2 (where a thin hologram is recorded), Fourier transform lens 82 could be replaced with a Fresnel transform lens provided the Fourier lens of the decrypting device—namely, lens 126 (of FIG. 4a), lens 126' (of FIG. 4b) or lens 326 of FIG. 5—is also replaced with a Fresnel lens.

Thus, the method of the present invention, unlike the prior art, allows decryption of the information without any losses and distortions (in the ideal case). As the offset parameter $F_o$ in Eqs. 9 and 11 gets smaller or parameter $\alpha$ in Eq. 16 gets larger, the quality of image reconstruction obtained will improve and the security of the encryption will be enhanced.

Because the spatial frequencies of F(q) and S(q) are in the same range, the encrypted information is highly protected from an unauthorized readout. Indeed, an attempt to decrypt the information without a proper fingerprint will lead to the appearance at the output device 130 a noisy pattern which relates neither to the information image nor to the fingerprint.

In embodiments based on the scheme of FIG. 1, thick or volume holograms may be used. Unlike the prior art, both the information to be encrypted and the cipher are placed into the same beam 59, and the second beam 61 is a plane wave. This means that each partial plane wave from the set related to the information encrypted in the beam 59 will interfere (and record a partial grating) only with the said plane wave 61. If one attempted to decrypt the information by illuminating the hologram with an arbitrary partial wave from said set (as it could be done in the prior art), he/she would obtain only a plane wave which does not carry any information.

The present invention also overcomes the drawbacks of the phase conjugation method. Performing the Fourier transform of the input fingerprint image yields the necessary invariance to the translation of the image. $F_o r$ example, a shift of the fingerprint image $f(r) \rightarrow f(r+r_o)$ in the decrypting device (FIGS. 4a or 4b) will lead only to a corresponding shift of the output image $s(r) \rightarrow s(r+r_o')$ and will not significantly affect the quality of image reconstruction. Also, the decrypting device (FIGS. 4a or 4b) does not require an SLM and is thus very simple and inexpensive.

In the encrypting device utilising $\phi(q)$, a shift of the fingerprint image on the prism surface 24 does not change the intensity distribution of a Fourier spectrum at all (if we neglect the finite aperture of the input image). Processing the input intensity distribution with the operator O (Eq. 15) to a certain extent overcomes both the poor consistency of input fingerprint images and the low energy content at some frequencies in Fourier spectra of the fingerprint images.

We claim:

1. A holographic method for encrypting an information image, comprising the following steps:
    obtaining a fingerprint image signal;
    obtaining a cipher signal based on a Fourier transform of said fingerprint image signal;
    obtaining a transformed information image signal to be encrypted;
    at least one of said cipher signal and said transformed information image signal chosen so that a spatial frequency content of said transformed information image signal overlaps with a spatial frequency content of said cipher signal;
    recording a hologram based on said cipher signal and said transformed information image signal such that a complex amplitude of a spatial grating of said hologram comprises a spatial complex conjugate of said transformed information image signal divided by a spatial complex conjugate of said cipher signal.

2. The method of claim 1 wherein said cipher signal is obtained by taking a Fourier transform of said fingerprint image signal.

3. The method of claim 2 wherein said transformed information image signal is obtained by taking a Fourier transform of an information image signal modulated with said information image.

4. The method of claim 2 wherein said hologram is a thin hologram and wherein said transformed information image signal is obtained by taking a Fresnel transform of an information image signal.

5. The method of claim 1 wherein said step of obtaining a cipher signal based on a Fourier transform of said fingerprint image signal comprises obtaining a digital fingerprint image signal and deriving a Fourier transform of said fingerprint image signal from said digital fingerprint image signal.

6. The method of claim 3 wherein said hologram recording step comprises the steps of:
    determining a complex conjugate of said Fourier transformed information image signal;
    determining a complex conjugate of said Fourier transformed fingerprint image signal; and
    dividing said complex conjugate of said Fourier transformed information image signal by a function of said complex conjugate of said Fourier transformed fingerprint image signal to obtain an addressing signal.

7. The method of claim 6 wherein said hologram recording step further comprises the steps of:
    addressing an SLM with said addressing signal;
    illuminating said SLM with coherent light to produce an object beam; and
    recording a hologram by means of interference of said object beam with a reference beam which is coherent with said object beam.

8. The method of claim 6 wherein said hologram recording step further comprises the steps of:
    determining an inverse Fourier transform of said addressing signal to obtain an inverse transformed addressing signal;

addressing an SLM with said inverse transformed addressing signal;

illuminating said SLM with coherent light to produce an object beam;

obtaining an optical Fourier transform of said object beam; and recording a hologram by means of interference of said object beam with a reference beam which is coherent with said object beam.

9. The method of claim 3 wherein said step of obtaining a Fourier transformed information image signal comprises the steps of:

addressing a first SLM with an information image signal;

illuminating said first SLM with a source of coherent light to produce a first recording beam; and optically Fourier transforming said first recording beam, and wherein said hologram recording step further comprises the steps of:

determining a complex conjugate of said Fourier transformed fingerprint image signal;

dividing a constant by a function of said complex conjugate of said Fourier transformed fingerprint image signal to obtain an addressing signal;

deriving an inverse Fourier transform of said addressing signal;

addressing a second SLM with said inverse Fourier transform of said addressing signal;

illuminating said second SLM with a source of coherent light to produce a second recording beam which is coherent with said first recording beam;

optically Fourier transforming said second recording beam; and interfering said Fourier transformed first recording beam with said Fourier transformed second recording beam.

10. The method of claim 6 wherein said step of dividing comprises determining whether an absolute value of a frequency component of said Fourier transformed fingerprint image signal exceeds a pre-determined offset and, if so, dividing by said Fourier transformed fingerprint image signal at said frequency component and, if not, dividing by a function of said offset and said frequency component at said frequency component.

11. The method of claim 6 wherein said hologram recording step further comprises the steps of:

addressing a hologram generator with said addressing signal;

recording a computer-generated hologram, said addressing signal being a complex amplitude of the spatial grating of said hologram.

12. The method or claim 1 wherein said cipher signal is obtained by:

obtaining a function based on an intensity distribution of a Fourier transform of said fingerprint image; and obtaining a complex exponential function of said intensity distribution based function.

13. The method of claim 12 wherein said step of obtaining a function based on an intensity distribution of a Fourier spectrum of said fingerprint image comprises performing an optical Fourier transform of said fingerprint image and capturing the intensity distribution of said Fourier transform.

14. The method of claim 12 wherein said step of obtaining a function based on an intensity distribution of a Fourier spectrum of said fingerprint image comprises obtaining said intensity distribution and seeding a random number generator with said intensity distribution to generate a randomized distribution.

15. The method of claim 12 wherein said step of obtaining a transformed information image signal to be encrypted and said hologram recording step comprise the steps of:

addressing a first phase-only SLM with said cipher signal;

illuminating said first SLM with a source of coherent light to produce a first recording beam;

addressing a second SLM with an information image signal;

illuminating said second SLM with a source of coherent light to produce a second recording beam which is coherent with said first recording beam;

passing said second recording beam through a Fourier transform lens to obtain a transformed second recording beam; and recording a hologram by means of interference of said first recording beam with said transformed second recording beam.

16. A holographic method for decrypting information comprising the steps of:

obtaining a fingerprint image signal;

obtaining a cipher signal based on a Fourier transform of said fingerprint image signal such that a spatial frequency content of said cipher signal overlaps with a spatial frequency content of a transformed information image signal;

illuminating a pre-recorded hologram with said cipher signal, said pre-recorded hologram having a complex amplitude of a spatial grating comprising a spatial complex conjugate of said transformed information image signal divided by a spatial complex conjugate of said cipher signal;

obtaining an optical inverse transform of a beam diffracted from said hologram; and registering an intensity distribution from said diffracted beam, said intensity distribution representing an information image in said transformed information image signal.

17. The method of claim 16 wherein the step of obtaining said cipher signal comprises obtaining a beam carrying an optical Fourier transform of said fingerprint image.

18. The method of claim 17 wherein said step of obtaining an optical inverse transform of a beam diffracted from said hologram comprises obtaining an inverse Fourier transform of a beam diffracted from said hologram.

19. The method of claim 17 wherein said hologram is a thin hologram and said step of obtaining an optical inverse transform of a beam diffracted from said hologram comprises obtaining an inverse Fresnel transform of a beam diffracted from said hologram.

20. The method of claim 16 wherein said cipher signal is obtained by:

obtaining a function based on an intensity distribution of a Fourier transform of said fingerprint image; and obtaining a complex exponential function of said intensity distribution.

21. A holographic method for securely handling an information image, comprising the following steps:

(a) encrypting said information image with the following steps:

obtaining a fingerprint image signal;

obtaining a cipher signal based on a Fourier transform of said fingerprint image signal;

obtaining a transformed information image signal to be encrypted;

at least one of said cipher signal and said transformed information image signal chosen so that a spatial frequency content of said transformed information image signal overlaps with a spatial frequency content of said cipher signal;

recording a hologram based on said cipher signal and said transformed information image signal such that a complex amplitude of a spatial grating of said hologram comprises a spatial complex conjugate of said transformed information image signal divided by a spatial complex conjugate of said cipher signal; and (b) decrypting said information image with the following steps:

illuminating said hologram with said cipher signal;

obtaining an optical inverse transform of a beam diffracted from said hologram; and registering an intensity distribution from said diffracted beam, said intensity distribution representing said information image.

22. The method of claim 21 wherein said cipher signal is obtained by taking a Fourier transform of said fingerprint image signal.

23. The method of claim 22 wherein said transformed information image signal is obtained by taking a Fourier transform of an information image signal modulated with said information image and wherein said step of obtaining an optical inverse transform of a beam diffracted from said hologram comprises obtaining an inverse Fourier transform of a beam diffracted from said hologram.

24. The method of claim 22 wherein said hologram is a thin hologram and wherein said transformed information image signal is obtained by taking a Fresnel transform of an information image signal and wherein said step of obtaining an optical inverse transform of a beam diffracted from said hologram comprises obtaining an inverse Fresnel transform of a beam diffracted from said hologram.

25. The method of claim 21 wherein said cipher signal is obtained by:

obtaining a function based on an intensity distribution of a Fourier transform of said fingerprint image; and obtaining a complex exponential function of said intensity distribution.

26. The method of claim 23 wherein said hologram recording step comprises the steps of:

determining a complex conjugate of said Fourier transformed information image signal;

determining a complex conjugate of said Fourier transformed fingerprint image signal; and dividing said complex conjugate of said Fourier transformed information image signal by a function of said complex conjugate of said Fourier transformed fingerprint image signal to obtain an addressing signal.

27. The method of claim 23 wherein said step of obtaining a Fourier transformed information image signal comprises the steps of:

addressing a first SLM with an information image signal;

illuminating said first SLM with a source of coherent light to produce a first recording beam; and optically Fourier transforming said first recording beam, and wherein said hologram recording step further comprises the steps of:

determining a complex conjugate of said Fourier transformed fingerprint image signal;

dividing a constant by a function of said complex conjugate of said Fourier transformed fingerprint image signal to obtain an addressing signal;

deriving an inverse Fourier transform or said addressing signal;

addressing a second SLM with said inverse Fourier transform of said addressing signal;

illuminating said second SLM with a source or coherent light to produce a second recording beam which is coherent with said first recording beam;

optically Fourier transforming said second recording beam; and interfering said Fourier transformed first recording beam with said Fourier transformed second recording beam.

* * * * *

UNITED STATES PATENT AND TRADEMARK OFFICE
CERTIFICATE OF CORRECTION

PATENT NO. : 5,740,276
DATED : April 14, 1998
INVENTOR(S) : George J. Tomko, et al.

It is certified that error appears in the above-identified patent and that said Letters Patent is hereby corrected as shown below:

IN THE CLAIMS

Claim 12, column 11, line 51, cancel "or" and insert --of--.

Claim 27, column 14, line 28, cancel "or" and insert --of--.

Claim 27, column 14, line 33, cancel "or" and insert --of--.

Signed and Sealed this

Fourth Day of August, 1998

Attest:

BRUCE LEHMAN

Attesting Officer

Commissioner of Patents and Trademarks